United States Patent [19]
Chamberlain, IV

[11] Patent Number: 5,764,054
[45] Date of Patent: Jun. 9, 1998

[54] CONTIGUOUSLY MATCHED MAGNETIC SENSOR ARRAY AND MAGNETIC MEDIA FOR AUTHENTICATION OF DOCUMENTS AND PRODUCTS

[75] Inventor: Frederick Rockwell Chamberlain, IV, Vista, Calif.

[73] Assignee: Eastman Kodak Company, Rochester, N.Y.

[21] Appl. No.: 666,771

[22] Filed: Jun. 19, 1996

[51] Int. Cl.$^6$ .................................. G01P 3/42; G07F 7/04
[52] U.S. Cl. ............... 324/235; 324/207.21; 324/207.12; 209/562; 235/449
[58] Field of Search .................. 324/173, 174, 324/207.21, 207.25, 207.12, 225, 235, 251; 338/32 R; 209/562; 235/449

[56] References Cited

U.S. PATENT DOCUMENTS

| | | | |
|---|---|---|---|
| 4,518,919 | 5/1985 | Ishida | 324/228 |
| 4,551,676 | 11/1985 | Amemiya et al. | 324/174 |
| 5,096,038 | 3/1992 | Potter et al. | 194/210 |
| 5,115,643 | 5/1992 | Hayata et al. | 62/115 |
| 5,327,077 | 7/1994 | Honda | 324/207.21 |
| 5,358,088 | 10/1994 | Barnes et al. | 194/206 |

*Primary Examiner*—Walter E. Snow
*Attorney, Agent, or Firm*—William F. Noval

[57] ABSTRACT

Apparatus for detecting a magnetic pattern having a plurality of spaced magnetic areas includes an array of magnetic sensors which are configured and spaced from each other to detect the spaced magnetic areas of a magnetic pattern brought into contiguity with the array. Electrical circuitry connects the array of magnetic sensors in series and a single source is provided for supplying current to the array of magnetic sensors through the electrical circuitry.

5 Claims, 3 Drawing Sheets

CONTIGUOUSLY MATCHED MAGNETIC SENSOR ARRAY AND MAGNETIC MEDIA FOR AUTHENTICATION OF DOCUMENTS AND PRODUCTS

FIELD OF THE INVENTION

This invention relates in general to magnetic pattern detection and more particularly relates to a detector for document authentication and character recognition which detects the presence or absence of specific magnetic patterns. These patterns may consist of intermittent areas of magnetized material or may consist of recorded transitions in a continuous piece of magnetic media.

BACKGROUND OF THE INVENTION

Magnetic patterns are well known in the field of document authentication. Many currency notes contain magnetic ink or hidden magnetic features. Checks have long used magnetic ink character recognition (MICR) for electronically reading the bank and account numbers. Increasingly, consumer products are being magnetically marked to enable counterfeit detection. Magnetic patterns are also used in machinery and process control applications.

Conventional systems for reading magnetic patterns involve moving the media past some kind of sensor. the temporal output of the sensor may be converted to a spatial representation of the pattern if the media speed is measured, or if an encoder is used to record the media position as it passes the sensor. This spatial representation may then be compared by some digital or analog electronic means to a set of known patterns to determine if the measured pattern is valid. The pattern may provide information about the document, such as denomination or serial number.

U.S. Pat. No. 5,358,088, issued Oct. 25, 1994, inventors Barnes et al., discloses a system for detecting magnetic data on media which utilizes an array or arrays of horizontal magnetoresistive sensors spaced apart a distance which corresponds to the separation of magnetic pattern data to be matched. Each MR sensor is a unit including two constant current sources, two resistors, two MR stripes, a ground and a differential amplifier. Two or more units include a voltage adder circuit and a comparator. This system is disadvantageous in its cost and circuit complexity.

U.S. Pat. No. 4,518,919, inventor Ishida, discloses a detector which detects only the presence or absence of a magnetic strip embedded in a document.

U.S. Pat. No. 5,096,038, inventors Potter et al., discloses a detector which can read a magnetic pattern in a document, in the conventional manner of moving the document past the detector to generate a temporal signal.

U.S. Pat. No. 5,115,643, inventors Jones et al., discloses a horizontal MR head applied in the conventional manner, i. e., moving the document past the head to generate a temporal signal.

SUMMARY OF THE INVENTION

According to the present invention, there is provided a solution to the problems of the prior art. According to a feature of the present invention, there is a provided apparatus for detecting a magnetic pattern having a plurality of spaced magnetic areas including: an array of magnetic sensors which are configured and spaced from each other to detect the spaced magnetic areas of a magnetic pattern brought into contiguity with said array; electrical circuitry for connecting said array of magnetic sensors in series; and a single source for supplying current to said array of magnetic sensors through said electrical circuitry.

DESCRIPTION OF THE PREFERRED EMBODIMENTS

Referring now to FIGS. 1a, 1b, 2, and 3, there are shown several applications in which magnetic patterns are used. These applications are illustrative only and many other such applications will be readily apparent to one skilled in the art. The present invention is applicable to any method of producing a magnetic pattern in a document, product, or machine, including but not limited to printed magnetic ink, paper containing magnetic particles, plastic containing magnetic particles, or conventional magnetic media, e. g., magnetic tape or a magnetic layer on film.

Figure 1A:
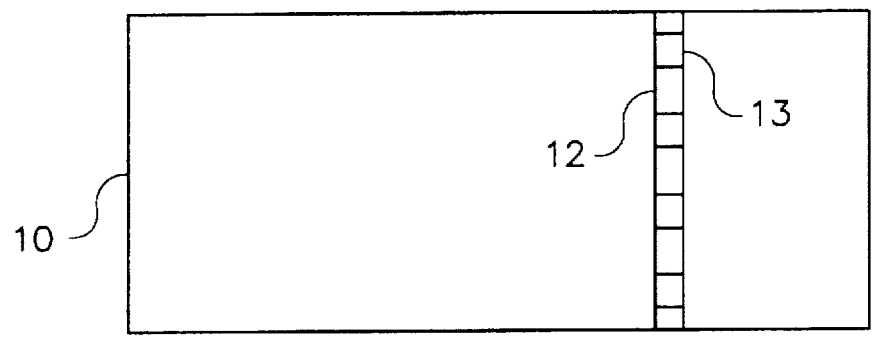
FIGS. 1a and 1b are respective diagrammatic views of a document and a package which contain magnetic patterns.
Figure 1B:
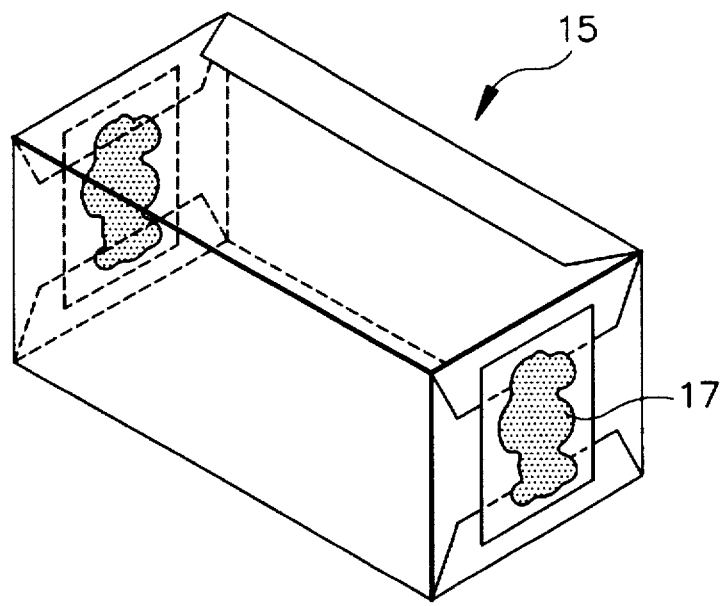

FIG. 1a shows a document 10 and FIG. 1b shows a package 15, each of which contain a different kind of magnetic pattern. Document 10 (FIG. 1a) contains an embedded security thread 12 which has intermittent areas of magnetic material 13 within it. Package 15 (FIG. 1b) is sealed on the ends with magnetic glue 17 which can be magnetically recorded with a pattern. Magnetic patterns may also be present in printed ink, within fibers of paper or cardboard, or hidden elsewhere.

Figure 2:
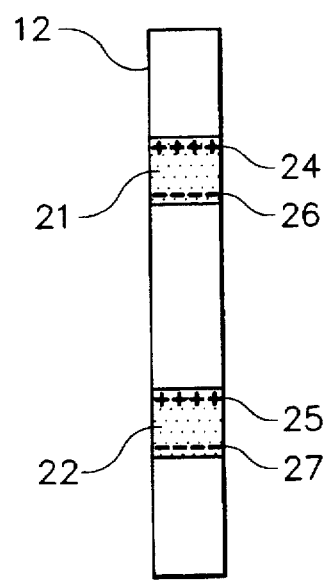
FIG. 2 is a diagrammatic view of a security thread with an intermittent magnetic pattern.

FIG. 2 shows a view of a section of thread 12 which has sections of magnetic material 21 and 22. To prepare this thread for detection, a DC magnetic field is applied in the direction along the length of the thread, forming regions of positive magnetic poles 24,25 and negative poles 26,27. This type of encoding has the advantage that it cannot possibly be erased, because it exists by virtue of the physical extent of the magnetic material.

Figure 3:
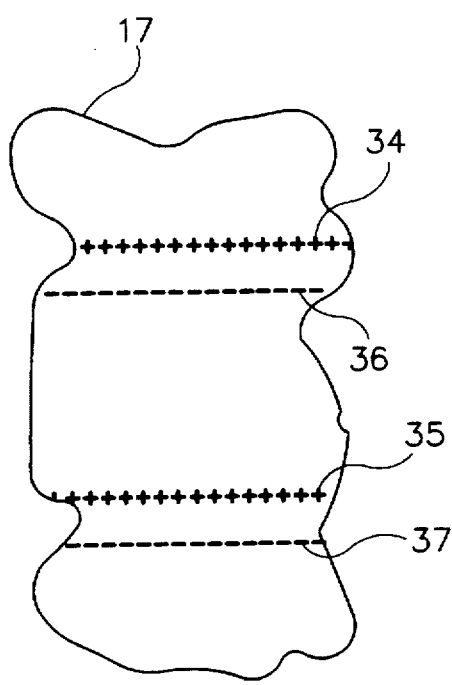
FIG. 3 is a diagrammatic view of a portion of magnetic glue used to seal a package and then recorded with a magnetic pattern.

FIG. 3 shows a portion of glue 17, which has been magnetically recorded with positive transitions 34,35 and negative transitions 36,37. The transitions are regions of magnetic poles which can be sensed by the detector.

Figure 4:
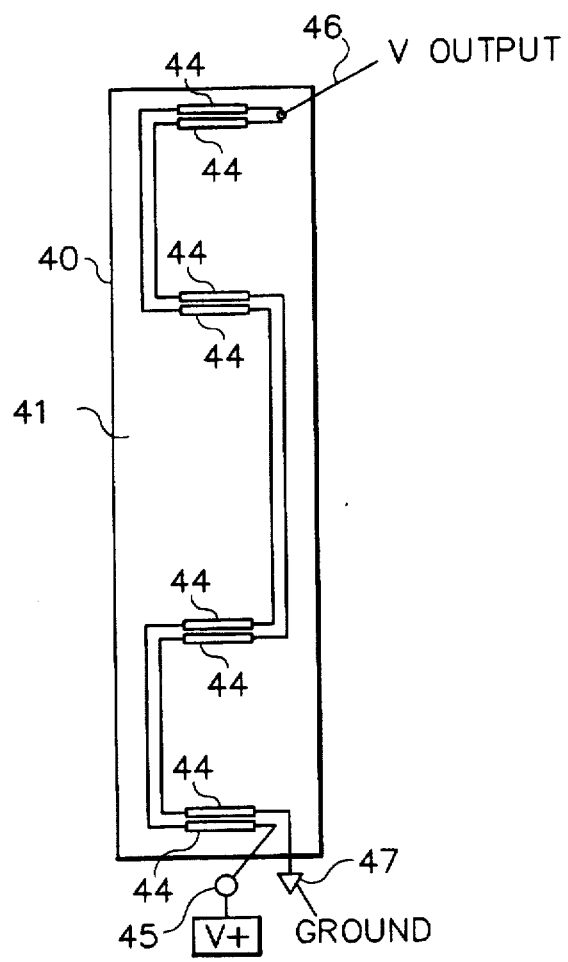
FIG. 4 is a schematic diagram of one embodiment of the present invention including a magnetoresistive (MR) sensor array.

Referring now to FIG. 4, there is shown one embodiment of the present invention. As shown, an MR sensor array 40 includes a substrate 41 having a set of identically biased horizontal MR elements 44 arranged in a pattern which matches the magnetic pattern to be detected. The gaps between each closely spaced pairs of MR elements 44 line up with a magnetic transition of the pattern. MR elements 44 are connected in series, with one end 45 of the circuit connected to a voltage source 70, the middle 46 of the circuit is the output, and the other end 47 of the circuit is connected to ground. When the magnetic pattern is aligned with the array, MR elements in the first half of the circuit increase in resistance, and the MR elements in the second half of the circuit decrease in resistance, producing a change in the output voltage at 46.

Figure 5:
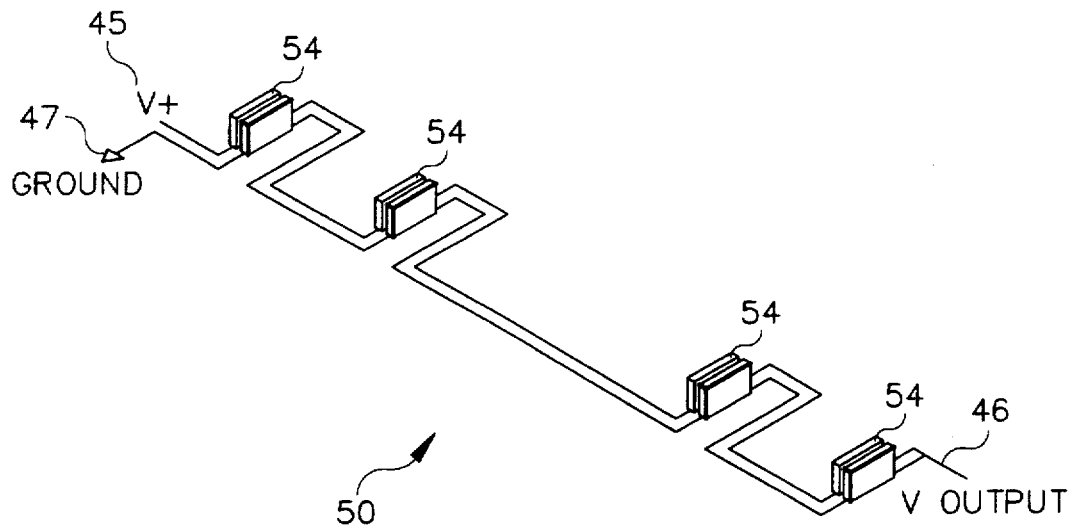
FIG. 5 is a perspective, schematic view of another embodiment of the present invention including an MR sensor array.

FIG. 5 shows another embodiment of the present invention in which the MR sensor array 50 includes vertical MR sensor elements 54. This embodiment has increased wear resistance and employs a sensor orientation with a proven track record.

Figure 6:
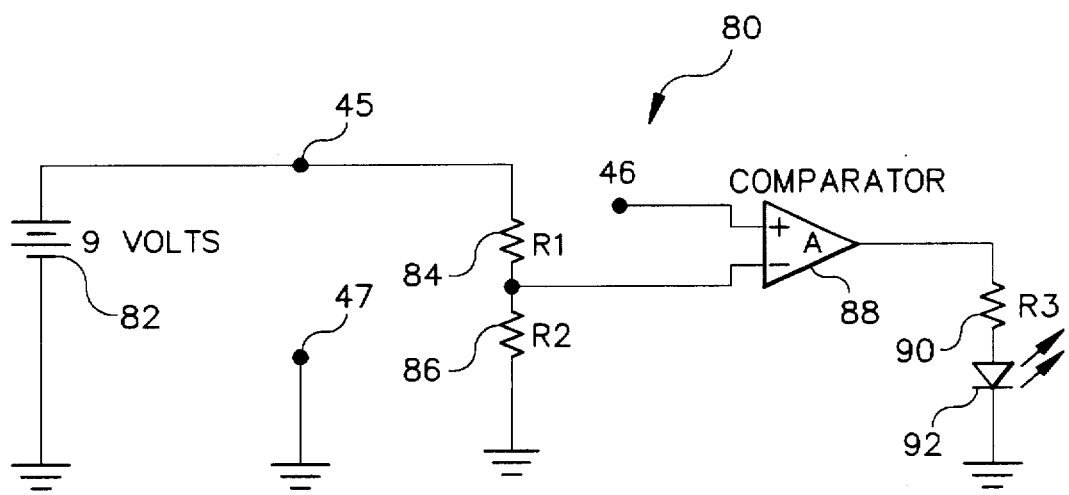
FIG. 6 is a schematic diagram of a circuit incorporating the present invention.

FIG. 6 is a schematic diagram for use with the detector arrays shown in FIGS. 4 and 5. As shown, the nodes 45, 46, and 47 of the sensor arrays shown in FIGS. 4 and 5, are connected to circuit 80. Circuit 80 includes a battery 82, resistors 84, 86 (R1,R2), comparator 88, resistor 90 (R3), and LED indicator 92. When a magnetic pattern to be detected is within the alignment tolerance, the output voltage of the MR sensor array at node 46, exceeds a level which causes comparator 88 to switch. The output of comparator 88 drives LED indicator 92.

A large number of MR arrays can assembled for detecting different magnetic patterns. The arrays can be placed coincident with each other on substrate 41 with appropriate electrical conductor circuitry. Each such array can be connected on the substrate to a voltage source at node 45 and to ground at node 47. The output at node 46 is independent however. Such a set of arrays can be used for all denominations of currency in a sorting and counterfeit detection machine, for all of a set of MICR characters, or for covering a range of codes for product packaging.

ADVANTAGES

The magnetic pattern detector of the present invention is a simple, easy to use, and low cost device for verifying the presence of magnetic patterns in documents, product packaging, or for machinery control.

In the embodiment of FIG. 4, all of the MR elements in the sensor array can be formed in one lithography step. The total number of process steps for the device is very small. Although there will be a large number of MR elements in the array, the large signal and huge wavelengths of the magnetic patterns to be detected allow the MR layer thickness to be increased. This provides an acceptable yield of workable devices per wafer. Moreover, only three connections to the array are required (V+, signal out, ground), whereas each additional array requires only on additional connection (signal out), thus minimizing the circuitry required.

The embodiment shown in FIG. 5, employs sensors whose operating characteristics are well known.

Because each MR element of the closely spaced pair of elements is on opposite legs of the output terminal 46, the device is insensitive to external magnetic fields and thermal noise.

The invention has been described in detail with respect to preferred embodiments thereof, but it will be understood that variations and modifications can be effected within the spirit and scope of the invention.

What is claimed is:

1. Apparatus for detecting a magnetic pattern having a predetermined number of spaced magnetic areas configured in a predetermined pattern, comprising:

a magnetic sensor array having a number of magnetic sensors equal in number to said predetermined number of spaced magnetic areas and configured in a predetermined pattern to match said predetermined pattern of said magnetic pattern to detect the spaced magnetic areas of a magnetic pattern brought into contiguity with said array;

electrical circuitry for connecting said array of magnetic sensors in series;

a single source for supplying current to said array of magnetic sensors through said electrical circuitry; wherein said sensors produce a single output which indicates detection of said pattern when said sensors and pattern match;

wherein said array of magnetic sensors are closely spaced pairs of first and second magnetoresistors, wherein said electrical circuitry includes first and second nodes and a third output node, such that said first magnetoresistor of each of said pair of magnetoresistors are connected in series between said first node and said output node, such that said second magnetoresistor of each of said pair of magnetoresistors are connected in series between said second node and said output node, and wherein said current source is connected to said first and second nodes; such that said thermal noise and noise from external magnetic sources is canceled.

2. The apparatus of claim 1 wherein said array of magnetic sensors are magnetoresistors.

3. The apparatus of claim 2 wherein said array of magnetic sensors are vertical magnetoresistors.

4. The apparatus of claim 2 wherein said array of magnetic sensors are horizontal magnetoresistors.

5. The apparatus of claim 1 including a comparator circuit connected to said output node.

* * * * *